US008824404B2

(12) United States Patent
Ratasuk et al.

(10) Patent No.: US 8,824,404 B2
(45) Date of Patent: Sep. 2, 2014

(54) REUSE OF LEGACY RADIO ACCESS TECHNOLOGY

(75) Inventors: Rapeepat Ratasuk, Hoffman Estates, IL (US); Mikko Aleksi Uusitalo, Helsinki (FI); Antti Sorri, Helsinki (FI); Amitabha Ghosh, Buffalo Grove, IL (US)

(73) Assignee: Nokia Siemens Networks Oy, Espoo (FI)

( * ) Notice: Subject to any disclaimer, the term of this patent is extended or adjusted under 35 U.S.C. 154(b) by 126 days.

(21) Appl. No.: 13/474,235

(22) Filed: May 17, 2012

(65) Prior Publication Data

US 2013/0308595 A1 Nov. 21, 2013

(51) Int. Cl.
H04W 4/00 (2009.01)

(52) U.S. Cl.
USPC .......................... 370/329; 370/252; 455/450

(58) Field of Classification Search
CPC ..... H04W 84/18; H04W 84/04; H04B 7/2643
USPC ......... 370/328–331, 336–339, 341–345, 437, 370/480–487, 491; 450/412, 168.1, 188.1, 450/418, 422.1, 432.1, 432.3, 434, 450/435.1–435.3, 436, 440, 444, 450, 450/452.1–452.2
See application file for complete search history.

(56) References Cited

U.S. PATENT DOCUMENTS

| | | |
|---|---|---|
| 2004/0071153 A1 | 4/2004 | Jasper et al. |
| 2010/0216478 A1 | 8/2010 | Buddhikot et al. ............ 455/450 |
| 2010/0222065 A1* | 9/2010 | De Pasquale et al. ........ 455/450 |
| 2011/0286408 A1 | 11/2011 | Flore et al. .................... 370/329 |
| 2011/0305206 A1 | 12/2011 | Junell et al. |
| 2012/0014332 A1* | 1/2012 | Smith et al. ................... 370/329 |
| 2012/0058772 A1 | 3/2012 | Kazmi et al. ................. 445/450 |

FOREIGN PATENT DOCUMENTS

| | | |
|---|---|---|
| EP | 2045970 A1 | 4/2009 |
| WO | WO 2010/068155 A1 | 6/2010 |

OTHER PUBLICATIONS

De Andrade, et al.; *GSM re-farming by LTE, UpLink Budget Consideration*; CSN '07 Proceedings of the Sixth IASTED International Conference on Communication Systems and Networks; ACTA Press Anaheim, CA, USA © 2007 (5 pages).

Sung, et al.; *Coexistence of LTE Femtocells with GSM Cellular Networks*; IEEE, 2010, 1556-1560.

J. Lotze, S.A. Fahmy, J. Noguera, B. Ozgül, and L. Doyle, "Spectrum Sensing on LTE Femtocells for GSM Spectrum Re-Farming Using Xilinx FPGAs" in Proceedings of the Software-Defined Radio Forum Technical Conference (SDR Forum), Washington, DC, Dec. 2009. (6 pages).

Papadimitratos, et al.; *A Bandwith Sharing Approach to Improve Licenses Spectrum Utilization*; IEEE Communications Magazine, vol. 43, num. 12, p. 10-14, Dec. 2005.

* cited by examiner

*Primary Examiner* — Dady Chery
(74) *Attorney, Agent, or Firm* — Harrington & Smith

(57) ABSTRACT

The specification and drawings present a new method, apparatus and software related product (e.g., a computer readable memory) for using (or reusing) unused frequency resources/ channels in a legacy radio access technology system (a first radio access technology system) such as GSM as additional/ reused resources for a future/advanced radio access technology systems (a second radio access technology system) such as LTE wireless system. In one embodiment, the extension carrier may be used to simultaneously deploy/assign, e.g., LTE transmission in the same frequency band as the legacy radio access technology system such as GSM with LTE transmission occupying empty GSM time plus frequency slots. In a further embodiment, LTE system over-provisioning may be used so that individual GSM channel(s) can be deactivated and used by the LTE system.

17 Claims, 8 Drawing Sheets

REUSE OF LEGACY RADIO ACCESS TECHNOLOGY

TECHNICAL FIELD

The exemplary and non-limiting embodiments of this invention relate generally to wireless communications and more specifically to using unused frequency resources/channels in the legacy radio access technology system for future/advanced radio access technology systems such as LTE systems.

BACKGROUND ART

The following abbreviations that may be found in the specification and/or the drawing figures are defined as follows:
3GPP third generation partnership project
ARQ automatic repeat request
BS base station
BSC base station controller
BW bandwidth
CDMA code division multiple access
CRS common reference signal
CSI channel state information
DL downlink
DMRS demodulation reference signal
ePDCCH enhanced physical downlink control channel
EDGE enhanced data rates for GSM (global) evolution
E-UTRA evolved universal terrestrial radio access
eNB or eNodeB evolved node B/base station in an E-UTRAN system
FDM frequency division multiplexing
FH frequency hopping
GSM global system for mobile communication
GPRS general packetradio services
E-UTRAN evolved UTRAN (LTE)
LTE long term evolution
LTE-A long term evolution advanced
PCC primary component carrier
PCFICH physical control format indicator channel
PDCCH physical downlink control channel
RE resource element
PHICH physical hybrid ARQ indicator channel
PSS primary synchronization signal
RB resource block
RS reference symbol
SCC secondary component carrier
SSS secondary synchronization signal
TS time slot
PRB physical resource block
UE user equipment (e.g. mobile terminal)
UL uplink
UMTS universal mobile telecommunications system
UTRAN universal terrestrial radio access network The amount of wireless data may increase about 100 times in 5 years. Even now smart phones are facing lack of capacity in the networks. Therefore extending existing carriers and/or allocating resources to support the increasing volume of wireless communications are needed.

SUMMARY

According to a first aspect of the invention, a method, comprising: receiving, by a network element for a second radio access technology system, scheduling information for using resources in a first radio access technology system; and assigning, by the network element for the second radio access technology system, additional resources for using in the second radio access technology system based on unused resources in the first radio access technology system determined from the scheduling information.

According to a second aspect of the invention, a

According to a second aspect of the invention, an apparatus comprising: at least one processor and a memory storing a set of computer instructions, in which the processor and the memory storing the computer instructions are configured to cause the apparatus to: receive scheduling information for using resources in a first radio access technology system, wherein the apparatus comprises a network element for a second radio access technology system; and assign additional resources for using in the second radio access technology system based on unused resources in the first radio access technology system determined from the scheduling information.

According to a second aspect of the invention, a computer program product comprising a computer readable medium bearing computer program code embodied herein for use with a computer, the computer program code comprising: code for receiving, by a network element for a second radio access technology system, scheduling information for using resources in a first radio access technology system; and code for assigning, by the network element for the second radio access technology system, additional resources for using in the second radio access technology system based on unused resources in the first radio access technology system determined from the scheduling information.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
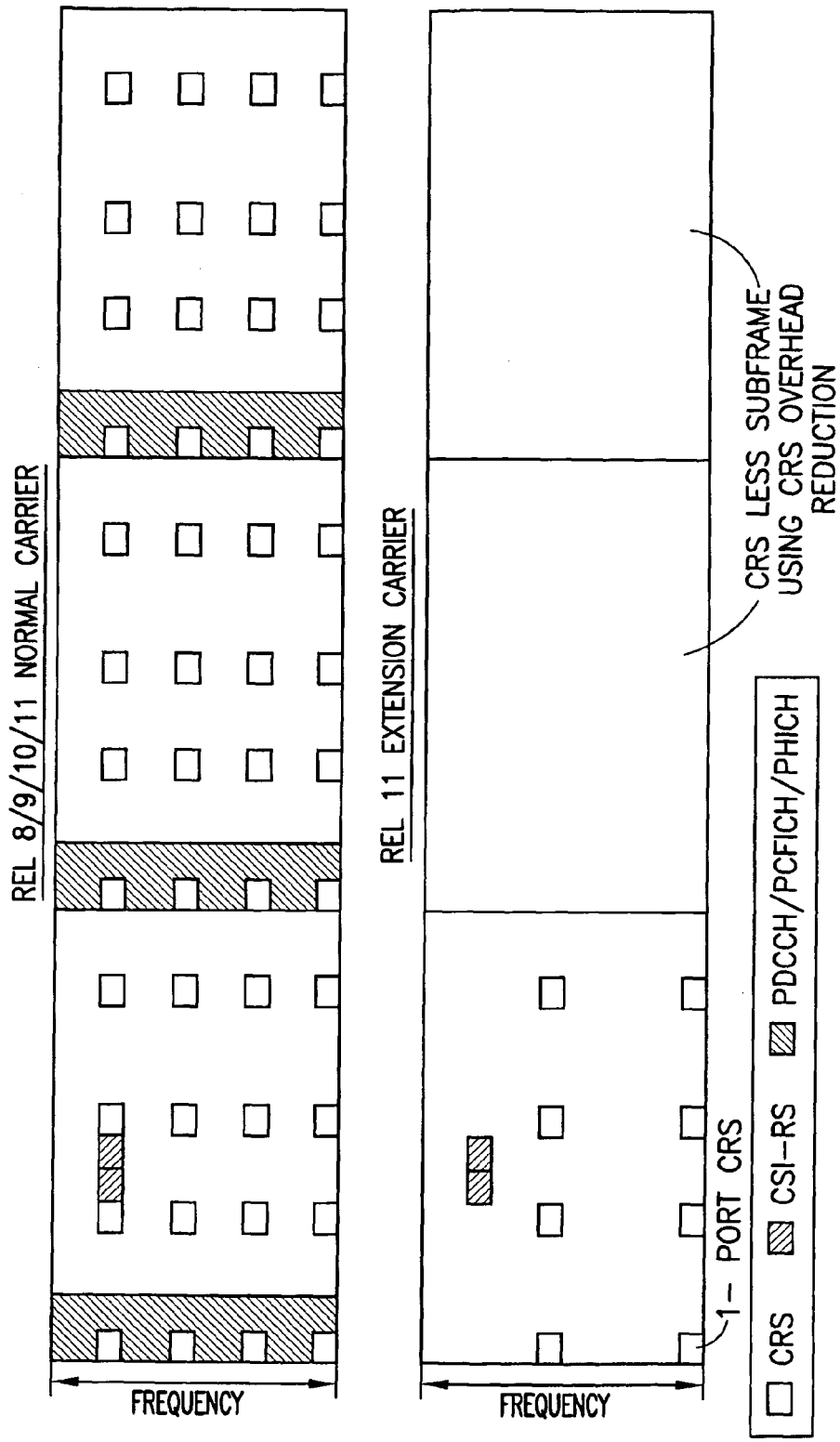
FIG. 1 is a set of frequency-time subframe diagrams demonstrating comparison of signaling for an extension carrier vs. a regular carrier.

By way of introduction, in LTE 3GPP Release-11, a new carrier type is introduced. This new carrier type is commonly referred to as an extension carrier and has several properties such as: a) no common control (PDCCH/PCFICH/PHICH) which spans the entire system bandwidth, b) supporting ePDCCH, c) reduced or eliminated CRS. An illustrative comparison of frequency-time signaling for regular carrier (top) subframes in 3GPP Release-8/9/10/11 and extension carrier (bottom) subframes in the 3GPP Release-11 is shown in FIG. 1. Currently, the extension carrier must be a part of a carrier aggregation deployment and constitutes a secondary component carrier (SCC). However, in the future, it may be possible that an extension carrier can be operated as a standalone carrier.

Figure 2:
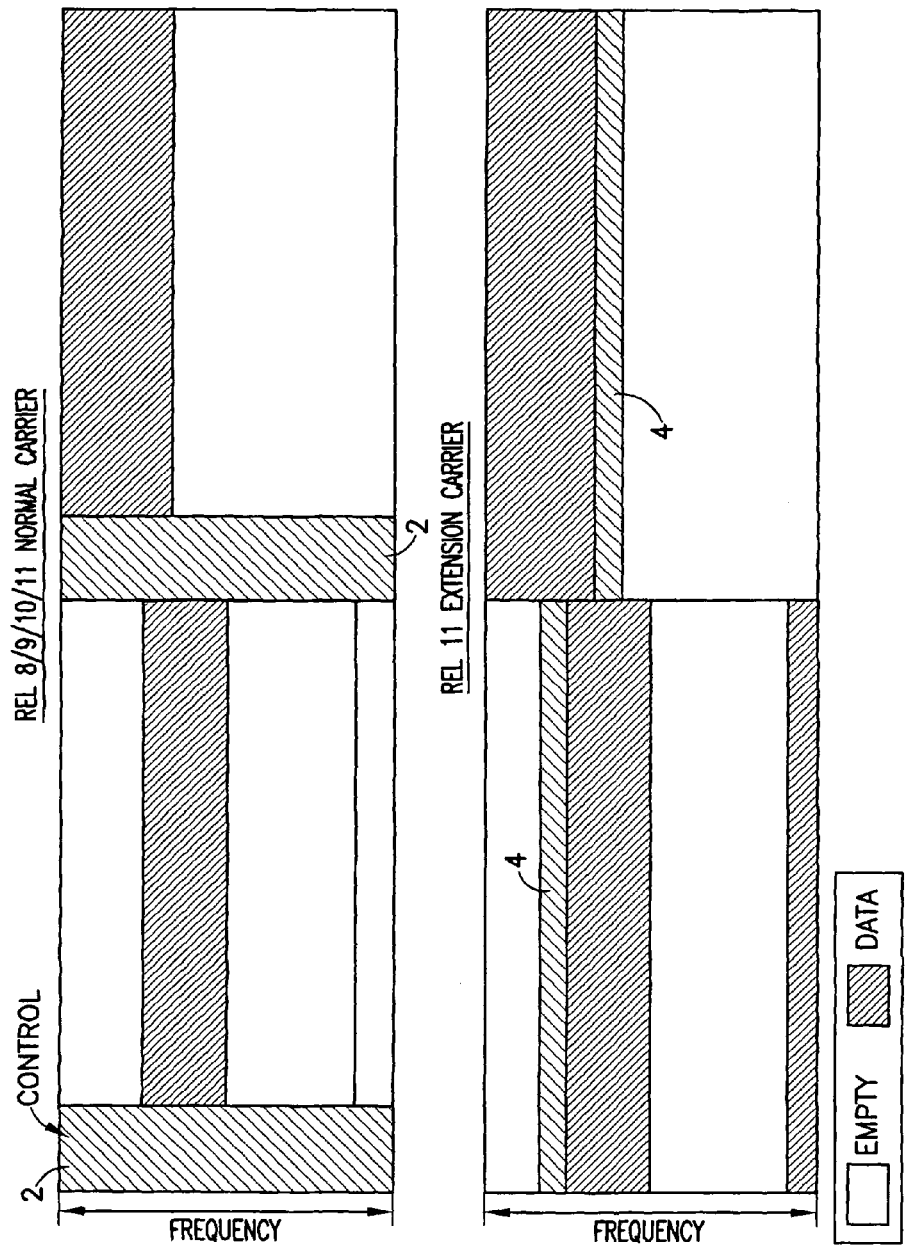
FIG. 2 is a set of frequency-time subframe diagrams demonstrating comparison of data and control transmission for an extension carrier vs. a regular carrier.

As can be seen in FIG. 1, an extension carrier subframe can be empty (see $2^{nd}$ and 3d subframes on the bottom with no CRS) or almost empty if there is no data transmission. Most importantly, even with the data transmission, the extension carrier does not have common control channels (PDCCH/PCFICH/PHICH) 2 that span the entire system bandwidth. Instead, transmissions on the extension carrier may be confined to a certain frequency region as shown in FIG. 2 (see extension carrier frames on the bottom for the 3GPP Release-11) and is similar to LTE UL transmission, wherein the common control channel 4 is confined to one frequency band of the entire system bandwidth.

This allows simultaneous transmission of LTE system (in DL and/or UL) within the spectrum being used by another legacy radio access technology system (e.g., GSM) with little or no interference using a FDM principle. For instance, during a GSM radio frame, unused time slots and frequency channels can be reused by the LTE system. Previously, this was not possible since common control channels and reference signals spanned the entire DL LTE system bandwidth. However, in the extension carrier, common control channels have been eliminated while common reference signals have been greatly reduced.

A new method, apparatus, and software related product (e.g., a computer readable memory) are presented for using (or reusing) unused frequency resources/channels in a legacy radio access technology system (a first radio access technology system) such as GSM as additional/reused resources for a future/advanced radio access technology systems (a second radio access technology system) such as LTE wireless system.

In one embodiment of the invention, the extension carrier may be used to simultaneously deploy/assign, e.g., LTE transmission in the same frequency band as the legacy radio access technology system such as GSM with LTE transmission occupying empty GSM time plus frequency slots. The assignment may be based on a frame or subframe allocation in the GSM. In other words, GSM (including GPRS/EDGE) resources should be prioritized/compared with LTE resources using available/unused bandwidth and time slots in GSM. The principle is demonstrated in FIGS. 3a-3c.

Figure 3:
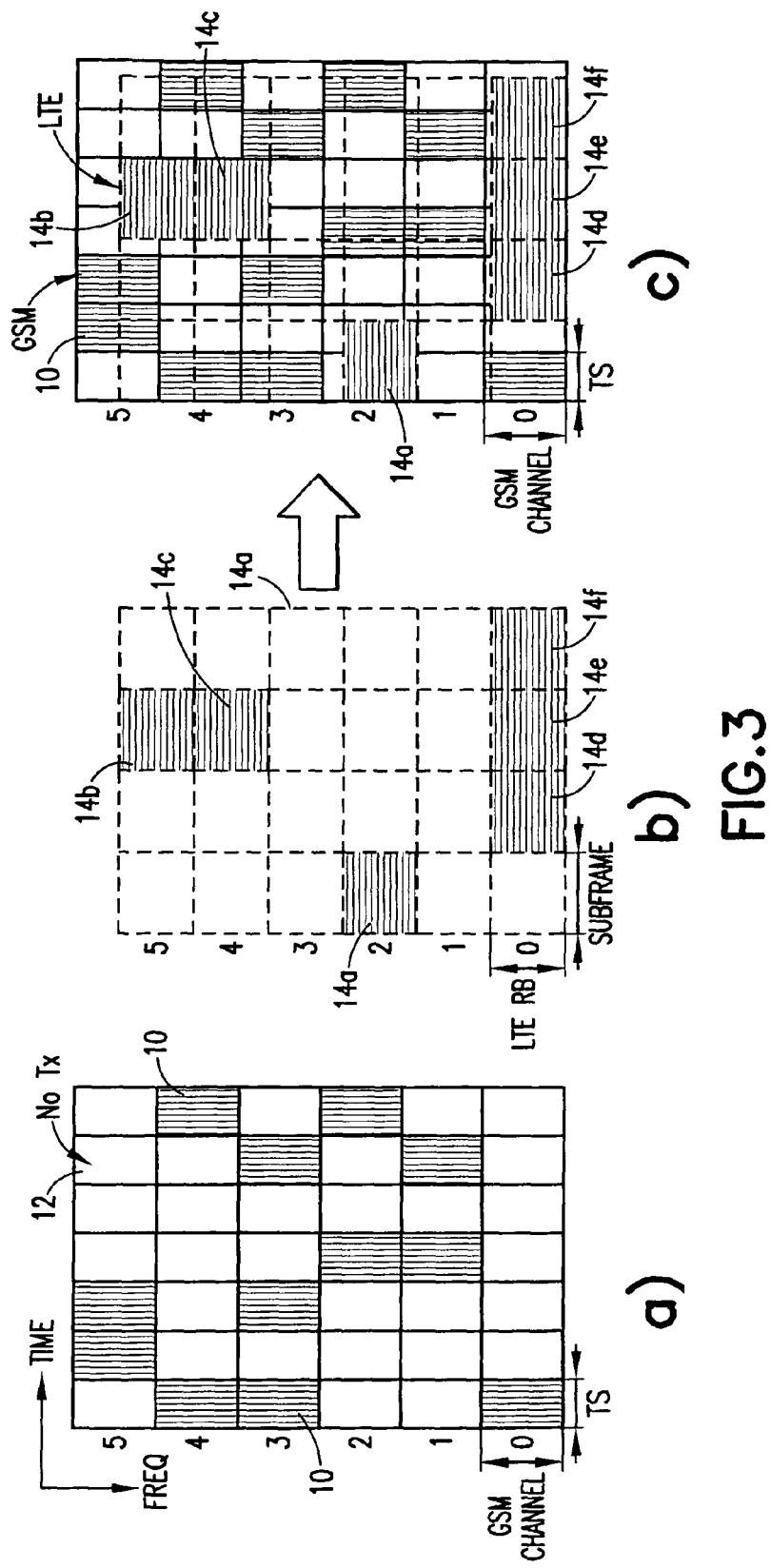
FIGS. 3a-3c are frequency-time diagrams demonstrating multiplexing of LTE into GSM spectrum without coordination for scheduling GSM resources, according to an exemplary embodiment of the invention.

FIG. 3a shows a frequency-time diagram of GSM channels/resources with 7 time slots of 0.577 ms each in time domain and 6 frequency channels each having 0.2 MHz bandwidth in frequency domain. FIG. 3a also indicates GSM resources 10 which are used for GSM data transmission, and available resources 12 (clear in FIG. 3a) which are not used for the data transmission in the GSM. Similarly, FIG. 3b shows a frequency-time diagram of LTE resources with 5 subframes of 1 ms each in time domain and 6 frequency units (typically with 12 subcarriers) each having 180 kHz bandwidth in frequency domain. The LTE resources shown in FIG. 3b may be used during time slots using frequency channels free of transmission in GSM channels/resources shown in FIG. 3a. Then scheduling/assignment of LTE resources will require coordination between GSM and LTE systems, so that scheduling or resource allocation information should be shared between systems. FIG. 3c shows a result of such coordination, where LTE RBs 14a-14f shown in FIGS. 3b and 3c are allocated (fitted in) for the unused GSM resources 12 shown in FIG. 3a.

Figure 4:
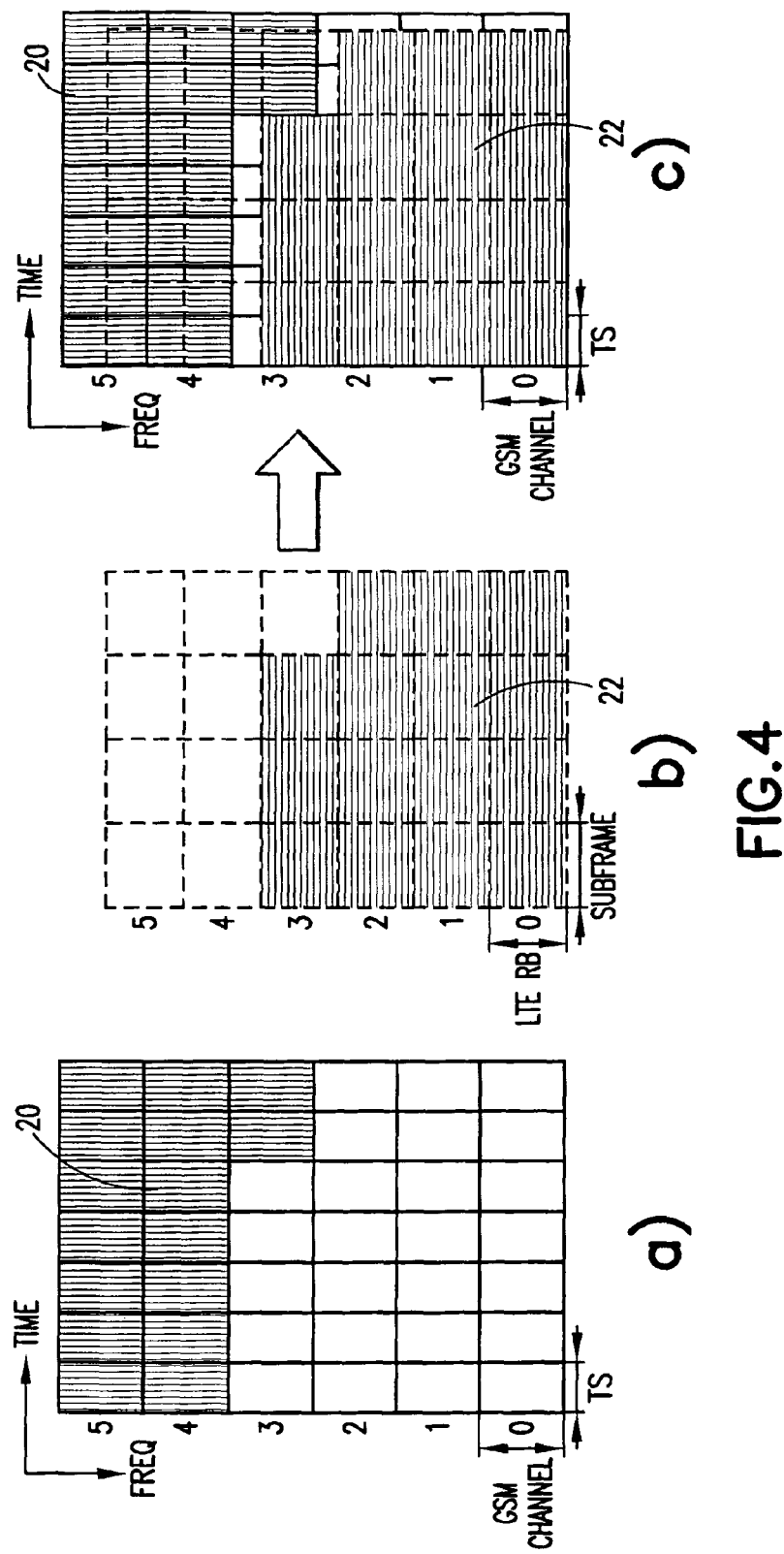
FIGS. 4a-4c are frequency-time diagrams demonstrating multiplexing of LTE into GSM spectrum with coordination for scheduling GSM resources, according to an exemplary embodiment of the invention.

Furthermore, to maximize the frequency-time resources available for reuse to the LTE system, resource allocation for the GSM may be done in the following manner as demonstrated in FIGS. 4a-4c which show GSM and LTE resource using similar frequency-time scales as in FIGS. 3a-3c. In general, the following steps may be used:

a) in frequency: line up GSM and LTE BW at the edge band (top or bottom). GSM slot assignment is done sequentially from the other band edge;

b) in time: line up GSM and LTE BW at the GSM frame/subframe edge (e.g., for a frame 120 ms, not shown in FIG. 4a-4c) and assign GSM from the end of the frame/subframe (last time slot) towards the beginning As shown in FIGS. 4a and 4c, when LTE RB0 & GSM channel 0 are lined up, GSM assignment 20 starts from channel 5, TS 6,5,4, . . . , 0, then channel 4, TS 6,5,4, . . . , 0, etc. This will allow the maximum free time/frequency resource 22 for LTE as shown in FIGS. 4b-4c. Alternatively, GSM resource allocation/assignment can be done by filling all the time slots first using all frequency channels, or by filling time slots from the end of GSM frame/subframe to the beginning. It is noted that GSM channel assignment algorithm can be altered based on load balancing algorithm, interference randomization, etc.

This assigning of the additional/reused resource for the LTE system, e.g., by the network element such as eNB, can be summarized (see FIGS. 3a-3c and 4a-4c for illustration) as follows: a) synchronizing frame or subframe boundary transmission timing and a frequency band location of the second radio access technology system such as LTE and the first radio access technology system such as GSM; b) determining unused time-frequency resources in the first radio access technology based on the scheduling information provided by the first radio access technology to the network element (eNB) of the second radio access technology; and c) matching time-frequency resources in the second radio access technology system with the determined (from the scheduling information) unused time-frequency resources in the first radio access technology.

From FIGS. 3a-3c and 4a-4c, it can be seen that without GSM resource allocation coordination six additional LTE RBs are available (FIG. 3c), but with GSM resource allocation coordination fifteen additional LTE RBs are available (FIG. 4c). From implementation perspectives, the GSM slot assignment may be predetermined for example every frame (120 ms for GSM and 20 ms for EDGE). As a result, the LTE scheduler can create a map of available RBs and subframes every GSM frame. GSM can send frame (or subframe) resource allocation information out to the LTE system for scheduling. Since the BSC does the allocation in the GSM, this information is centralized so that it can be shared with the LTE system. For example, for co-located sites of GSM and LTE, the BSC may send its scheduling information to the LTE system directly or indirectly (through the GSM). In the LTE system, DMRS and ePDCCH/cross-carrier scheduling may be used to avoid interference to the GSM.

It is noted that if CRS is required in the extension carrier described herein, then CRS may generate interference to the GSM. However, this can be minimized by using one antenna port and reduced CRS bandwidth. It is further noted that CSI-RS interference to the GSM can be reduced to a minimum by using only one RE per antenna port per PRB when a number of antenna ports more than one. Also in case of PSS/SSS interference to the GSM some GSM time plus frequency slots may have to be left empty for LTE PSS/SSS transmission. Moreover, in the 3GPP Release-11, GSM spectrum reuse using the extension carrier will be in the form of a SCC in the LTE system, but in the future/future releases it may be a standalone carrier.

In a further embodiment of the invention, there is no dynamic spectrum sharing between GSM and LTE. However, LTE system over-provisioning may be used so that individual GSM channel (rather than a group of channels) can be deactivated and used by the LTE system. Some coordination and cooperation are required between the GSM and LTE systems, which can be performed in a static or semi-static manner.

Figure 5:
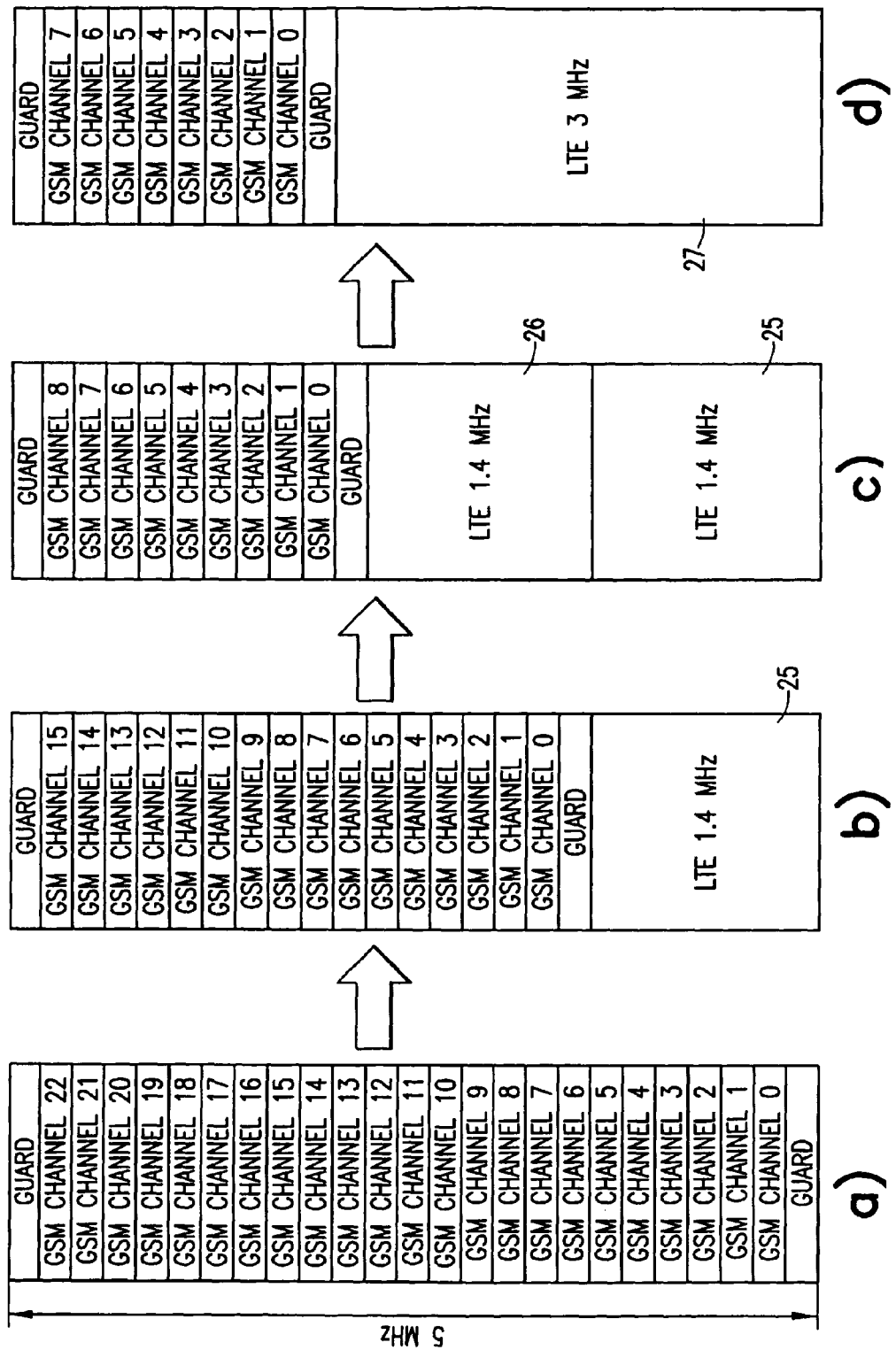
FIGS. 5a-5d are frequency-time diagrams demonstrating GSM spectrum re-farming for LTE systems, according to exemplary embodiments of the invention.
Figure 7:
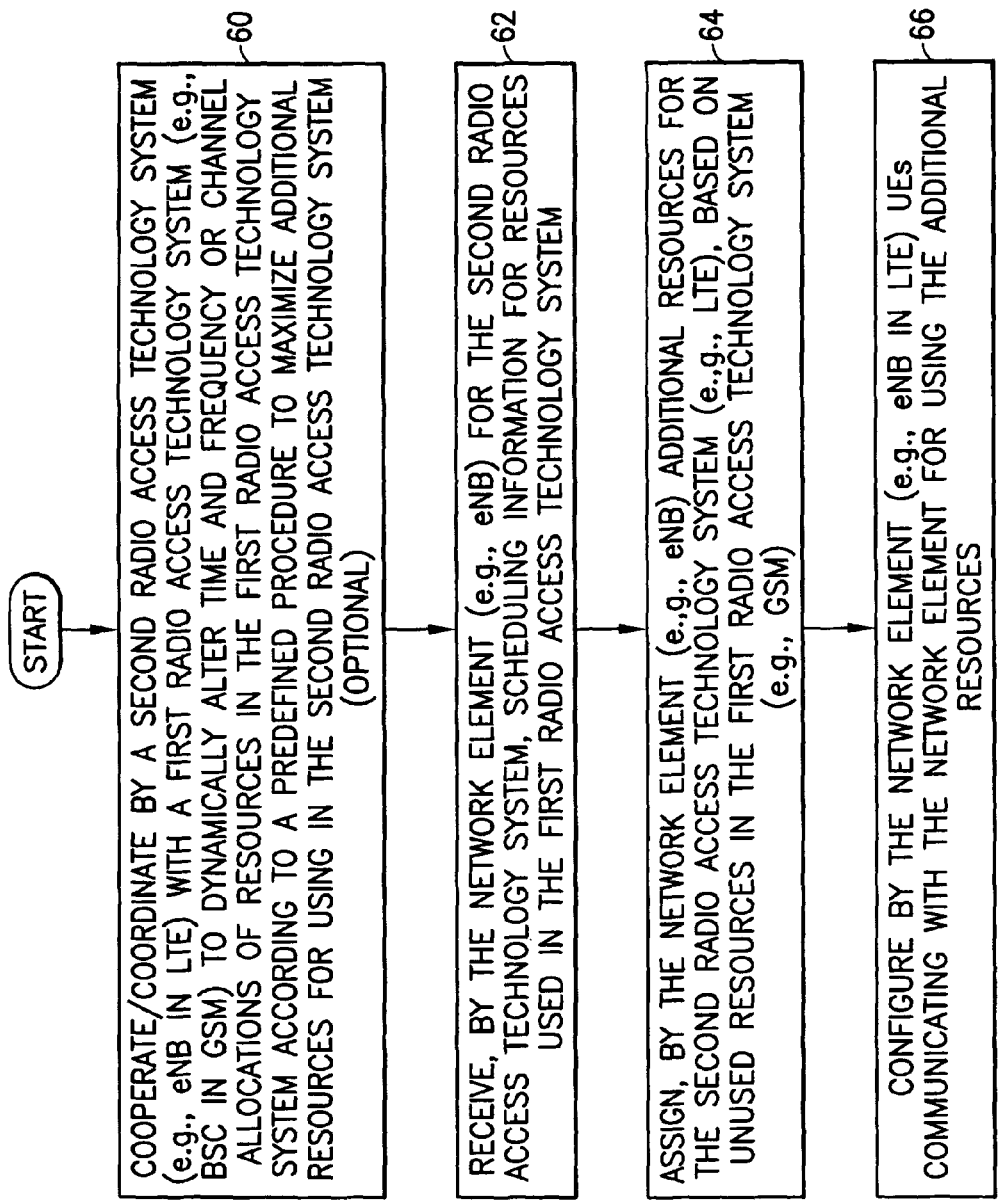
FIG. 7 is a flow chart demonstrating implementation of exemplary embodiments of the invention.

As GSM channels are deactivated, they can be reused in the LTE system. However, LTE bandwidths are quantized, for example to ~1.4, 3, 5, 10, 15, 20 MHz. Therefore, GSM channels must be deactivated in a group in order to use GSM spectrum in LTE systems. This embodiment is illustrated in FIGS. 5a-5d. In this example, to support 1.4 MHz LTE deployment, 7 GSM channels must be deactivated. FIG. 5a shows 23 GSM channels numbered from 0 to 22. As GSM load decreases, additional GSM channels can be deactivated in groups. In this case, the LTE system cannot take advantage of deactivated GSM channels until enough bandwidth can be accumulated to fit LTE channels. For example, as shown in FIG. 5b 7 deactivated GSM channels 25 are fitted to one 1.4 MHz BW LTE channel. In FIG. 5c further 7 deactivated GSM channels 26 (in addition to 7 GSM channels shown in FIG. 5b) are fitted to another 1.4 MHz BW LTE carrier (total of 2.8 MHz BW for LTE deployment). Finally, in FIG. 5d one additional GSM available channel is added thus bringing total LTE BW reused on available 15 GSM channels 27 to 3 MHz.

Figure 6:
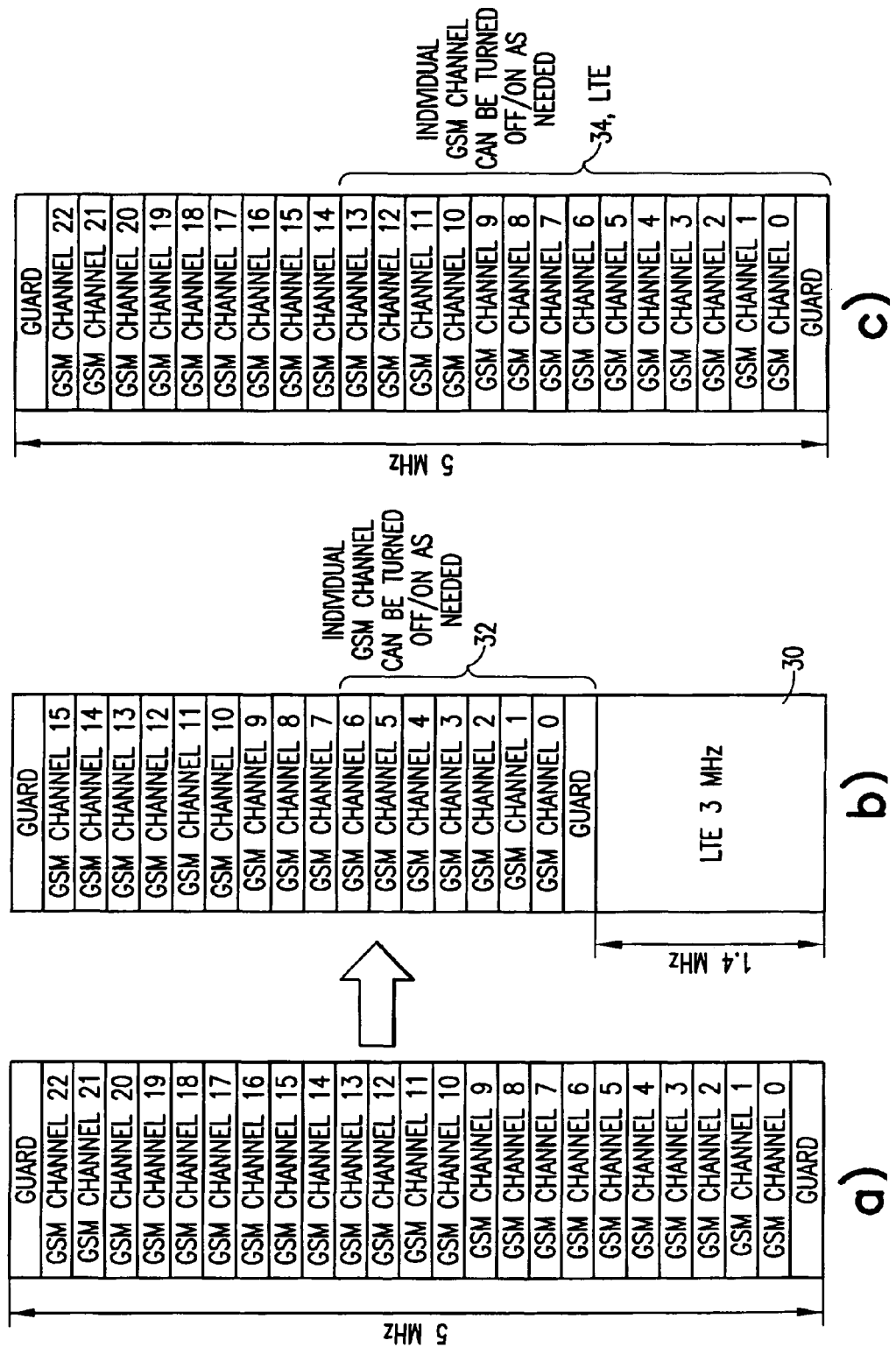
FIGS. 6a-6c are frequency-time diagrams demonstrating GSM spectrum re-farming for LTE systems using extension carrier, according to exemplary embodiments of the invention.

Alternately (as shown in FIGS. 6a-6c), we can use LTE as an extension carrier 30 (see FIG. 6b) and over-provision LTE BW to cover also still active GSM channels. FIG. 6a shows 23 GSM channels numbered from 0 to 22. Then individual GSM channels can be turned off as we add more capacity gradually to the LTE system. This is shown in FIG. 6b. In this race, only 7 GSM channels 32 are available for reuse by the LTE system. However, LTE BW of 3 MHz is deployed as an extension carrier as shown in FIG. 6b. This over-provisioning allows individual GSM channel to be turned off and to be reused for the LTE system without having to wait for a block of GSM channels to become available. In this case, as the load on GSM decreases, individual channel can be turned off and reused for LTE (see FIGS. 6b and 6c). FIG. 6c has an extension carrier 34 that overlaps completely with the GSM carriers. So in the scenario shown in FIG. 6c we provision for the LTE carrier but it cannot be used until either (1) at least one of the GSM channel is deactivated or (2) we can use the dynamic method shown in FIGS. 3a-3c and 4a-4c.

Note that this approach can be also used to dynamically grow or shrink LTE spectrum. For example, as shown in FIG. 6b, LTE has exclusive use of 1.4 MHz but can grow up to 3 MHz for a period of time (e.g., for one GSM radio frame of 120 ms) based on demand. It can also shrink if needed as GSM takes up LTE bandwidth within the 1.4 MHz. To grow or shrink LTE spectrum dynamically, GSM channels may have to be turned off sequentially since GSM channel bandwidth is not the same as LTE RB bandwidth. In this case, LTE spectrum will grow or shrink from one end of the spectrum to the other.

In another embodiment the LTE system may be deployed as an underlay to the GSM macro system. As the GSM channels are turned off, different or same set of LTE carriers can be deployed as pico cells. The pico cells can be randomly distributed or can form a cluster. If the pico cells are randomly distributed they may use the same carrier frequency since they are at a lower power. For a cluster deployment, a frequency reuse pattern (e.g., 7 or 3) can be used to mitigate intra-pico cell interference.

It is further noted that the embodiments illustrated in FIGS. 5a-5d and 6a-6c are applicable not only to the GSM but also to other legacy radio access technologies such as CDMA-1×, UMTS, etc., with the concept remaining the same. GSM is only one example.

The exemplary embodiments described herein provide a number of advantages which include (but are not limited to): faster connectivity for end users: more capacity and less delays, better spectral efficiency, etc.

FIG. 7 shows an exemplary flow chart demonstrating implementation of embodiments of the invention by a network element (e.g., eNB). It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 7, in a first step 60, a second radio access technology system (e.g., eNB in LTE) can optionally cooperate/coordinate with a first radio access technology system (e.g., BSC in GSM) to dynamically alter time and frequency or channel allocations of resources in the first radio access technology system such as GSM according to a predefined procedure to maximize the additional resources for using/reusing in the second radio access technology system (see examples in FIGS. 5a-5c and 6a-6c).

In a next step 62, the network element such as eNB for the second radio access technology system receives scheduling information such as time and frequency allocations or channel allocations (each channel having one dedicated frequency/bandwidth allocation) of resources used in the first radio access technology system for using resources in the first radio access technology system (e.g., GSM).

In a next step 64, the network element such as eNB assigns additional resources for the second radio access technology system (e.g., LTE) based on unused resources in the first radio access technology system (e.g., GSM).

In a next step 66, the network element such as eNB configures UEs for using the available resources for communicating (in DL and/or UL) with the network element eNB.

Figure 8:
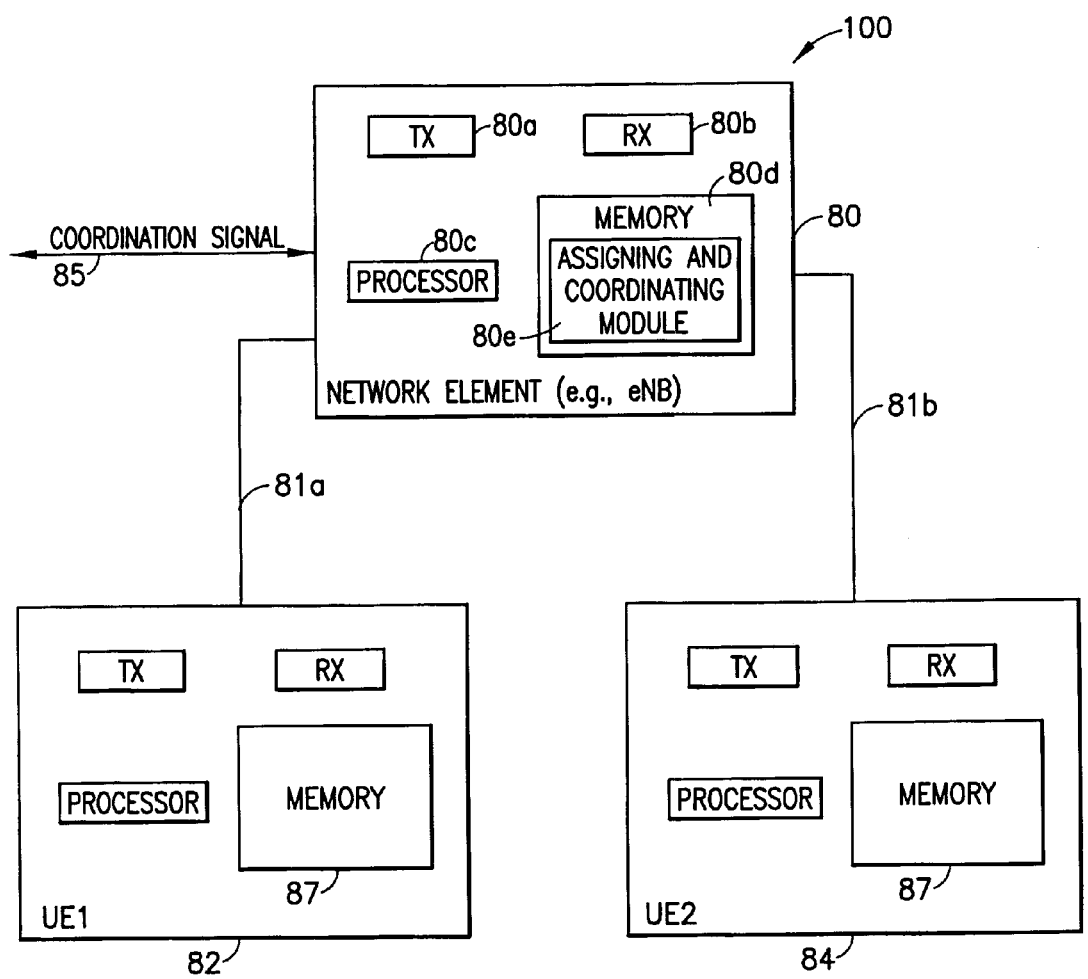
FIG. 8 is a block diagram of network elements for practicing exemplary embodiments of the invention.

FIG. 8 shows an example of a block diagram demonstrating LTE devices including a network element (e.g., eNB) 80 comprised in a network 100, and UEs eNBs 82 and 84 communicating with the eNB 80, according to an embodiment of the invention. FIG. 8 is a simplified block diagram of various electronic devices that are suitable for practicing the exemplary embodiments of this invention, and a specific manner in which components of an electronic device are configured to cause that electronic device to operate.

The network element 80 may comprise, e.g., at least one transmitter 80a at least one receiver 80b, at least one processor 80c at least one memory 80d and an assigning and coordinating application module 80e. The transmitter 80a and the receiver 80b may be configured to provide a wireless communication with the UEs 82 and 84 (and others not shown in FIG. 7), e.g., through corresponding links 81a and 81b, according to the embodiment of the invention. Also the device 80 can communicate directly or indirectly using a wireless or wired link 85 with the first radio access technology system such as GSM for coordination of allocation of GSM resources as described herein. The transmitter and the receiver 80*b* may be generally means for transmitting/receiving and may be implemented as a transceiver, or a structural equivalence thereof. It is further noted that the same requirements and considerations are applied to transmitters and receivers of the UEs 82 and 84.

Various embodiments of the at least one memory 80*d* (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80*c* include but are not limited to general purpose computers, special purpose computers, microprocessors, digital signal processors (DSPs) and multi-core processors Similar embodiments are applicable to memories and processors in other devices 82 and 84 shown in FIG. 7.

The assigning and coordinating application module 80*e* may provide various instructions for performing steps 60-68 shown in FIG. 7. The module 80*e* may be implemented as an application computer program stored in the memory 80*d*, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80*e* may be implemented as a separate block or may be combined with any other module/block of the device 80, or it may be split into several blocks according to their functionality.

The devices 82 and 84 may have similar components as the network element 80, as shown in FIG. 7, so that the above discussion about components of the eNB 80 is fully applicable to the components of the UEs 82 and 84.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
cooperating by a network element for a second radio access technology system with a first radio access technology system to dynamically alter time and frequency allocations of resources in the first radio access technology system according to a predefined procedure to provide additional resources for using in the second radio access technology system;

receiving, by the network element for the second radio access technology system, scheduling information for using resources in the first radio access technology system, wherein the scheduling information comprises time and frequency allocations of resources in the first radio access technology system, and the additional resources are assigned based on the time and frequency allocations of resources in the first radio access technology system; and assigning, by the network element for the second radio access technology system, additional resources for using in the second radio access technology system based on unused resources in the first radio access technology system determined from the scheduling information.

2. The method of claim 1, wherein the additional resources are assigned to at least one of uplink resources and downlink resources.

3. The method of claim 1, wherein the predefined procedure to provide additional resources for using in the second radio access technology system is to a maximize the available resources.

4. The method of claim 1, wherein the assigning of the additional resources comprises:
synchronizing frame or subframe boundary transmission timing and a frequency band location of the second radio access technology system and the first radio access technology system;
determining unused time-frequency resources in the first radio access technology based on the scheduling information; and
matching time-frequency resources in the second radio access technology system with the determined unused time-frequency resources in the first radio access technology.

5. The method of claim 1, wherein the scheduling information comprises channel scheduling including activation and de-activation of one or more channels in the first radio access technology system, each channel having one dedicated frequency allocation, and the additional resources are assigned based on the channel scheduling in the first radio access technology system.

6. The method of claim 1, wherein the first radio access technology system is a global system for mobile communication, and the second radio access technology system is a long term evolution system.

7. The method of claim 1, wherein the network element is an eNB.

8. The method of claim 1, further comprising:
configuring by the network element user equipments for using the additional resources for communicating with the network element.

9. An apparatus comprising:
at least one processor and a memory storing a set of computer instructions, in which the processor and the memory storing the computer instructions are configured to cause the apparatus to:
cooperating by the apparatus, wherein the apparatus comprises a network element for a second radio access technology system, with a first radio access technology system to dynamically alter time and frequency allocations of resources in the first radio access technology system according to a predefined procedure to provide additional resources for using in the second radio access technology system;
receive scheduling information for using resources in a first radio access technology system, wherein the scheduling information comprises time and frequency allocations of resources in the first radio access technology system, and the additional resources are assigned based on the time and frequency allocations of resources in the first radio access technology system; and assign additional resources for using in the second radio access technology system based on unused resources in the first radio access technology system determined from the scheduling information.

10. The apparatus of claim 9, wherein the additional resources are assigned to at least one of uplink resources and downlink resources.

11. The apparatus of claim 9, wherein to assign the additional resources, the computer instructions are further configured to cause the apparatus to:

synchronize frame or subframe boundary transmission timing and a frequency band location of the second radio access technology system and the first radio access technology system;

determine unused time-frequency resources in the first radio access technology based on the scheduling information; and match time-frequency resources in the second radio access technology system with the determined unused time-frequency resources in the first radio access technology.

12. The apparatus of claim 9, wherein the scheduling information comprises channel scheduling including activation and de-activation of one or more channels in the first radio access technology system, each channel having one dedicated frequency allocation, and the additional resources are assigned based on the channel scheduling in the first radio access technology system.

13. The apparatus of claim 9, wherein the first radio access technology system is a global system for mobile communication, and the second radio access technology system is a long term evolution system.

14. The apparatus of claim 9, wherein the network element is an eNB.

15. The apparatus of claim 9, wherein the computer instructions are further configured to cause the apparatus to:

configure by the network element user equipments for using the additional resources for communicating with the network element.

16. The apparatus of claim 9, wherein the predefined procedure to provide additional resources for using in the second radio access technology system is to maximize the available resources.

17. A computer program product comprising a non-transitory computer readable medium bearing computer program code embodied herein for use with a computer, the computer program code comprising:

code for cooperating by a network element for a second radio access technology system with a first radio access technology system to dynamically alter time and frequency allocations of resources in the first radio access technology system according to a predefined procedure to provide additional resources for using in the second radio access technology system;

code for receiving, by the network element for the second radio access technology system, scheduling information for using resources in the first radio access technology system, wherein the scheduling information comprises time and frequency allocations of resources in the first radio access technology system, and the additional resources are assigned based on the time and frequency allocations of resources in the first radio access technology system; and code for assigning, by the network element for the second radio access technology system, additional resources for using in the second radio access technology system based on unused resources in the first radio access technology system determined from the scheduling information.

* * * * *